United States Patent [19]

Fermaglich

[11] Patent Number: 4,518,503

[45] Date of Patent: May 21, 1985

[54] WATER PURIFICATION METHOD AND DEVICE

[75] Inventor: Saul Fermaglich, Woodcliff Lake, N.J.

[73] Assignee: Intercontinental Water Corp., Norwood, N.J.

[21] Appl. No.: 594,926

[22] Filed: Mar. 29, 1984

[51] Int. Cl.³ .............................................. C02F 9/00
[52] U.S. Cl. .................................... 210/662; 210/664; 210/694; 210/86; 210/104; 210/180; 210/186
[58] Field of Search ............... 210/664, 694, 774, 775, 210/86, 104, 176, 180, 181, 184–186, 257.1, 472, 908–910, 662

[56] References Cited

U.S. PATENT DOCUMENTS 4,219,415  8/1980  Nassef et al. ..................... 210/694

Primary Examiner—Ivars Cintins
Attorney, Agent, or Firm—Bauer & Amer

[57] ABSTRACT

A water purifier for treating water intended for drinking and like purposes, for installation at point-of-use, i.e., home, office or workplace, which is effective in removing additional contaminents therefrom using a heated carbon filter and distillation, in which the water being purified is heated and induced to alternately flow back and forth between an open compartment used for the filter and a closed evaporator in which it is distilled, the intervals of flow into the filter compartment being effective to heat the filter to thereby increase its ability to remove heavy molecular pollutants (e.g., pesticides, herbicides, etc.) and also being an advantageous location from which there is released to atmosphere low molecular volatile pollutants (e.g., certain hydrocarbons, the trihalomethanes, and other volatile organic compounds), and the succeeding intervals of flow into the evaporator completing the purification process by causing the removal, by distillation, of undesirable dissolved minerals and metals in the steam forced from the evaporator into a condenser preparatory to a change in phase to water for drinking and like uses.

12 Claims, 3 Drawing Figures

WATER PURIFICATION METHOD AND DEVICE

The present invention relates generally to an improved method and device having point-of-use utility, i.e., at home, office or workplace, for further purifying water that may have already been rendered potable, in that it is bacteriologically disinfected, but still has an undesirable content of pollutants, and, more particularly, to a method and device using in a unique cooperative relation an activated carbon filter and distillation to remove from said potable water high molecular weight pollutants, as exemplified by hydrocarbons introduced into the water supply as the result of pesticides, and herbicides, low molecular weight pollutants—as exemplified by certain of the by-product trihalomethanes of the disinfectant chlorine—and dissolved and undissolved amounts of minerals, metallic salts, and other matter.

Potable water, such as is obtained from a municipal or other public water supply, may be bacteriologically safe to drink in that it is readily possible to be given sufficient disinfectant to achieve this result. However, despite the processing of the water in a typical municipal supply system, which processing may include storage, settling, coagulation, chemical treatment, and further settling, additional purification may nevertheless be required since most of the inorganic material that may be in the water, such as toxic heavy metals, and nitrates and other salts and minerals, simply pass through the system unaffected. Further, in the case of chlorine and when excessive iodine are used as disinfectants, these disinfectants add undesirable taste and odor to the water even after treatment, and they even result in undesirable toxic chemical by-products.

Also, while it is known that trace amounts of metals are required for proper human metabolism, and in these small amounts, as generally obtained in drinking water, are considered nontoxic, at higher concentrations the prolonged ingestion of these metals may cause disease and illness. For example, the ingestion of an excessive amount of copper is believed to cause liver damage. The same is known to be true of other minerals, wherein it is believed that excessive sodium intake contributes to an age-related increase in blood pressure that culminates in hypertension in genetically susceptible people. An excessive amount of sulfate may cause not only adverse taste effects, but also physiological effects, the most common being that it acts as a laxative, and, sulfates are also believed to be the cause of hard scales in boilers and heat exchangers and home appliances using water.

Thus, even with the availability of potable water from municipal water supply systems, there is a need for point-of-use water purifiers, i.e., devices used at home, office or workplace, to achieve further chemical removal of organic or inorganic contaminants from the water. Such devices use different physical and chemical principles to accomplish this separation, for example, distillation, carbon adsorption, ion exchange and reverse osmosis, and are well known, being exemplified by the devices of U.S. Pat. No. 4,339,307, No. 4,247,369 and No. 3,935,077.

These prior art devices, however, do not always effectively remove all categories of pollutants. Particularly troublesome for example, are chlorides and sulfates which cannot be removed easily from drinking water except by using relatively expensive treatment, and/or blending with low chloride waters, although blending is usually not practical since in many cases the concentration of chlorides amounts to about 50% of the minerals dissolved in a drinking water source.

Broadly, it is an object of the present invention to provide a readily inexpensive, yet highly efficient, point-of-use water purifier which overcomes the foregoing and other shortcomings of the prior art. More particularly, it is an object to provide a water purifier that utilizes to maximum advantage an activated carbon filter and the technique of distillation to separate to a significant extent all categories of pollutants from the drinking water, including the highly volatile, low molecular weight chemicals that are often dissolved in the water supply as a result of contamination by detergents, industrial wastes, seepage of saline surface waters, and other sources.

A water purification method demonstrating method objects and advantages of the present invention contemplates the separating by evaporation of hydrocarbons and like pollutants from water being purified using a heated activated carbon filter wherein communication through a fluid connection is established between an evaporator closed to atmosphere and a compartment having an activated carbon filter. Water, under pressure, is forced through the activated carbon filter and into its compartment and from thence in a first direction through the fluid connection into the closed evaporator, in which it is changed into steam. Some of the steam is channelled into a condenser for a phase change back to fluid incident to being used as purified drinking water, while a remaining portion has the effect of forcing the heated drinking water in the evaporator to flow in a reverse second direction through the fluid connection from said closed evaporator back into the activated carbon filter compartment. There is thus heat exchange between the back flowing heated water being treated and the activated carbon filter and the water in the filter compartment which enhances the removal of certain hydrocarbons and like pollutants from the water being purified in the activated carbon filter.

Additionally, and constituting an inventive contribution of the within method, the conditions of temperature and pressure of the back-flowing heated water returning to the filter compartment are such as to result in a phase change from liquid to vapor of highly volatile pollutants therein, and thus the release thereof to atmosphere. This is important since these volatile pollutants are not part of the steam which is within the evaporator and which, as part of the distillation process, is allowed, in contrast with prior art methods, to pass from the evaporator into the condenser of the system, in the production of water for drinking and other purposes.

The above brief description, as well as further objects, features and advantages of the present invention, will be more fully appreciated by reference to the following detailed description of the inventive method herein, as well as of a presently preferred, but nonetheless illustrative embodiment of a device practicing said method, when taken in conjunction with the accompanying drawings, wherein.

Figure 1:
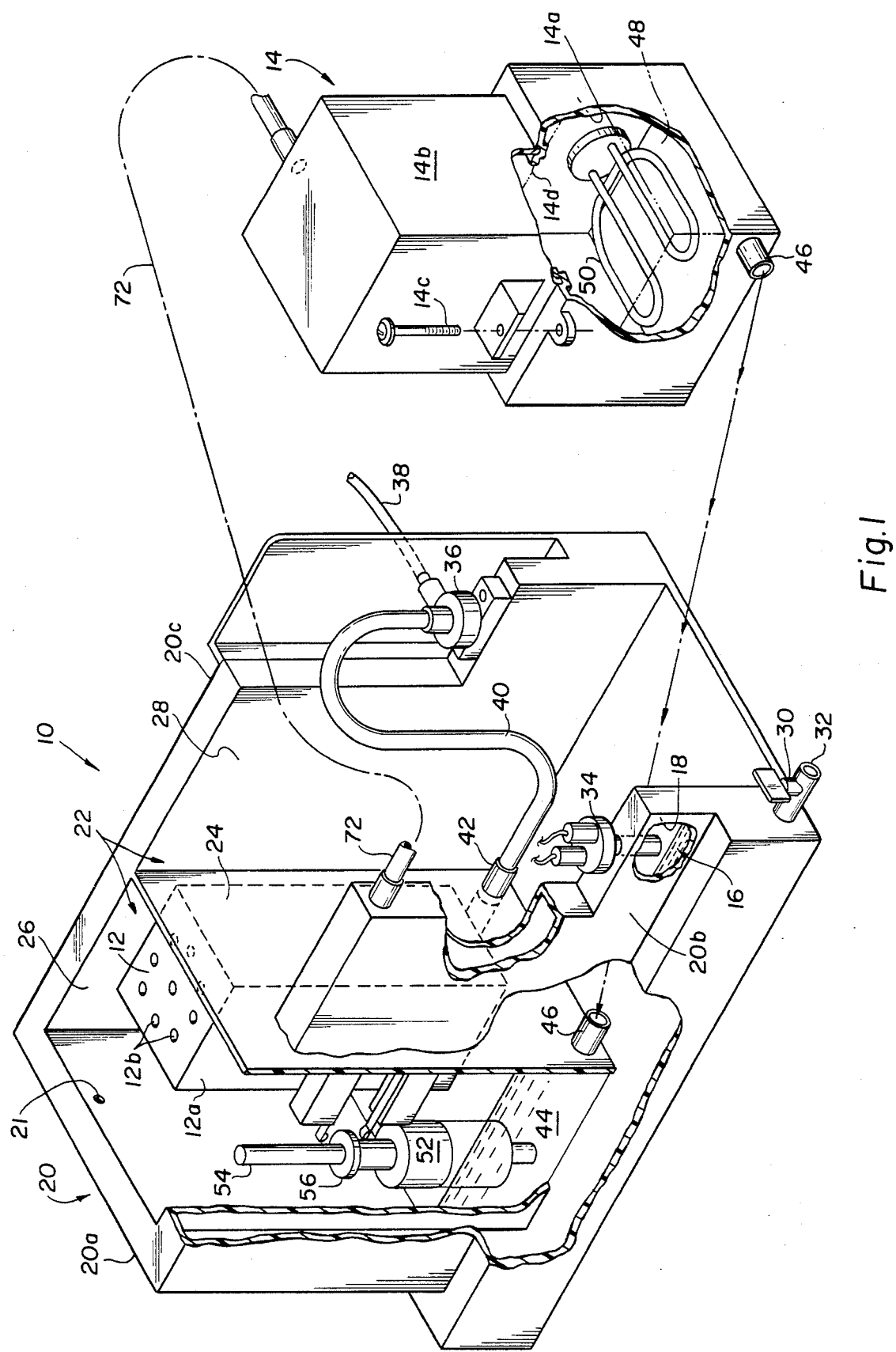
FIG. 1 is an isometric view, partly exploded and partly broken away to better illustrate structural features of the components which are embodied by the inventive device and which also are recommended for use in the practice of the within inventive method.

Illustrated in FIG. 1 is a point-of-use water purifier, generally designated 10, which in an effective manner, as will be explained in detail subsequently herein, uses a carbon filter, generally designated 12, and water distillation within an evaporator, generally designated 14, to more effectively and thoroughly remove pollutants that might still remain in drinking water that previously may have been rendered potable and is obtained from a municipal or other public water supply system. Thus, even though such potable water may be bacteriologically safe to drink, there still may be a need to further improve the chemical, physical and aesthetic characteristics thereof by giving it additional treatment with a point-of-use water purifier, such as the within water purifier 10.

More particularly, although it is already well known to use an activated carbon filter and distillation as occurs in an evaporator in order to purify water for drinking and other such purposes, the present invention contemplates a cooperative, unique operative relation between the carbon filter 12 and the evaporator 14, which results in a more effective removal of heavy and low molecular weight pollutants, as well as the removal of the usual totally dissolved undesirable metals and minerals which customarily contaminate and pollute drinking water and remain therein, despite typical treatment techniques of a municipal water supply system, such as storing, settling, coagulation, chemical treatment, and further settling, along with the addition of disinfectants and the like. To be even more specific, and as will be explained in detail herein, the activated carbon filter is maintained at a desirable high temperature and as a consequence has been found in practice to be more effective in removing from the drinking water the hydrocarbon pollutants or heavy molecular weight materials which unavoidably find their way into the water supply as a result of the use of pesticides, herbicides, and improper disposal of industrial waste.

Also, although it is well known that the direct distillation of impure water, as occurs in an evaporator such as the evaporator 14 is effective in removing totally dissolved solids, such as undesirable metals and minerals, heretofore such direct distillation of water, which contemplates the change of water from its liquid into its vapor phase, was not effective in removing volatile materials, such as chlorine, which is used as a disinfectant, and other low molecular weight materials, such as the chemicals typically used in detergents, and which, inadvertently, find their way into the water supply. As will be explained and described in detail subsequently herein, however, the distillation of the water which occurs in the evaporator 14 is practiced on water from which both low and high molecular weight organic materials have already been removed, so that the vaporized water that enters into the condenser and changes its phase therein back to fluid does not therefore contain these organic pollutants and to this extent is therefore in a significantly improved purified state as compared with similarly contaminated water intended for drinking purposes directly distilled by prior art evaporators.

The construction and operational mode of the water purifier 10 is perhaps best understood by describing the water purification process in specific connection with FIG. 1. As depicted therein, a volume of purified drinking water 16 in which the pollutants have been removed in accordance with the inventive method hereof will be understood to exist in a condenser compartment 18 of a U-shaped condenser, generally designated 20, which is comprised of a rear panel or leg 20a and opposite sides or legs 20b and 20c which cooperate to bound an internal operative area, generally designated 22. The operative area 22 is subdivided by a transverse wall 24 connected to extend between the opposite sides 20b and 20c into a rearwardly disposed filter compartment 26 and a forwardly disposed evaporator compartment 28. Disposed respectively in the compartments 26 and 28 are the previously noted activated carbon filter 12 and the evaporator 14.

Assuming unit 10 is connected to a municipal water supply and to a source of electrical power, its operation may be commenced by operating an "On" button or switch 82 (FIG. 3) which completes an electrical circuit that, in a well understood manner, generates a valve-operating electrical pulse which is transmitted to a normally closed valve 36 which, in response to the electrical pulse is pulsed into its open condition and thus allows the potable water from the municipal water supply system to pass through conduit 38 and through the then open valve 36 into a conduit 40 connected, as at 42, to a hollow cylinder, of plastic or other appropriate construction material, which channels the water through the transverse wall 24 and completes a fluid connection to an area surrounding the external container 12a of the activated carbon filter 12. As a result, the water, under the pressure head of the municipal water supply system, is delivered into the bottom of the filter container 12a and is forced upwardly through the activated carbon material, which it will be understood exists within and comprises the activated carbon filter 12. This water exits from the filter 12 through the upper openings, individually and collectively, designated 12b, and thus starts to fill up the filter chamber 26.

At this point it should be noted that the water exiting from the openings 12b has, of course, been filtered by the activated carbon filter 12, and this filtration process, according to the present invention, is conducted more efficiently and effectively than prior art activated carbon filters for the reason that the activated carbon is maintained at an elevated temperature, all as will become more apparent as the description proceeds. More particularly, the heated activated carbon filter 12 is particularly effective in removing heavy molecular pollutants, such as hydrocarbons, which are the result of contamination of the water source by herbicides and pesticides and the like, in preference to low molecular pollutants or volatile materials, such as the commonly used water supply-disinfectant chlorine. As understood, the carbon removes the pollutant or contaminant by molecular adsorption, and since it is at an elevated temperature, the low molecular materials are "boiled off," thus preserving the carbon as a site for molecular adsorption of the heavy molecular materials. The manner in which the filter 12 is maintained at an elevated temperature will soon be explained.

The carbon-filtered water exiting from the openings 12b will, of course, start to fill the filter compartment 26, such build-up of filtered water being illustrated and designated in FIG. 1 by the reference numeral 44 and constituting a first stage of purified water which is characterized in that it has had removed therefrom heavy molecular pollutants, but may still contain the light molecular pollutants and undesirable amounts of dissolved minerals and metals.

In accordance with an important aspect of the present invention, fluid communication is established between the filter compartment 26 and the interior of the evaporator 14 which is in the compartment 28, said fluid communication being in the illustrated embodiment achieved by the use of a cylinder 46 connected to allow the passage of the filtered water volume 44 to pass through the transverse wall 24 into the interior space 14a which is bounded by the closed exterior housing 14b of the evaporator 14. As a result of the fluid communication 46 which is established between the filter compartment 26 and the evaporator interior 14a there is an equalization of water level, and thus the level of the filtered water 44 will be the same as the level build-up 48 of water within the evaporator 14. The significance of this will soon be apparent, and is perhaps best understood by referring to FIG. 2 as well as to FIG. 1, to which two figures reference should now be made.

Figure 2:
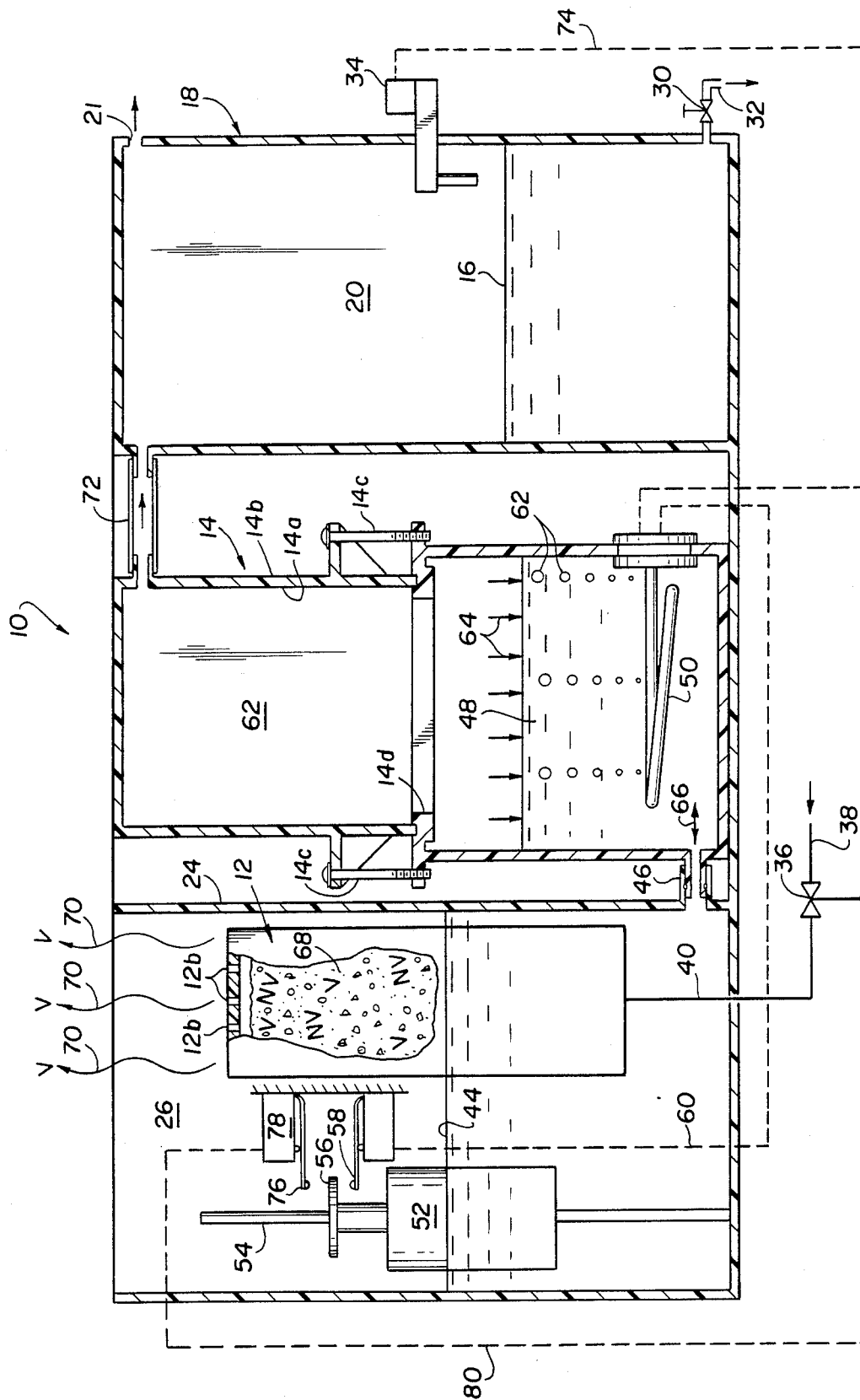
FIG. 2 is a longitudinal, cross-sectional view of the within inventive device, and also a schematic view of the controls imposed on the operation of the various components thereof.

Although as a result of the fluid communication provided by the fluid connection 46 between the filter compartment 26 and the interior compartment 14a of the evaporator 14 the water volumes 44 and 48 therein will normally seek the same level, these volumes 44 and 48 are not shown at the same level in FIG. 2 because the condition of the apparatus 10 as depicted in FIG. 2 is at an advanced stage at which an electrical heater 50 of the evaporator 14 is in operation. More particularly, the filtered water 44 which exists from the filter 12 through the upper openings 12b will, of course, fill the compartment 26 and, in the process, cause ascending movement in a float 52 which is disposed in the filter compartment 26 for movement along a vertical path 54. Such movement in the float 52 eventually results in a laterally extending contact 56 being lifted off a lower electrical contact arm 58 of an electrical switch, the result of which will be understood and as will be subsequently explained, enables the closing of an electrical switch to complete an electrical circuit, represented by the reference numeral 60 in FIG. 2, which results in the energization and operation of the previously noted heater 50 which is immersed in the body of water 48 within the evaporator 14. Heater 50 thus starts to heat the volume of water 48, causing it ultimately to boil, and continues to do so until the operation of the heater 50 is terminated in a manner which subsequently will be explained. However, while it is operational, heater 50 in a well understood manner raises the temperature of the water 48 to the boiling point thus causing a phase change from fluid to vapor, the latter phase change being represented by the bubbles individually and collectively designated 62 and constituting what is commonly referred to as steam. The steam 62 generated in the evaporator 14 fills the compartment 14a bounded by the exterior housing 14b and ultimately, as will be readily understood, results in a pressure or force, individually and collectively designated by the reference arrows 64, which presses down on the water volume 48. Thus, steam pressure 64 is effective in forcing heated water 48 from the evaporator 14 back through the fluid connection 46 into the filter compartment 26, this two-way direction of fluid movement being represented by the double-headed arrow 66.

The filtered and now heated water 44 which returns from the evaporator 14 back into the filter compartment 26 will be understood to be in surrounding relation to the filter 12 and thus, by heat exchange therewith, raises the temperature of the activated carbon material 68 to typically around 80 degrees Centigrade at which, as already noted, it preserves itself as a site for molecular adsorption of heavy molecular hydrocarbons and other pollutants.

At this point it should also be noted that the heated filtered water 44 which returns to the filter compartment 26 also contains the light molecular or volatile pollutants, such as trihalomethane, a byproduct resulting from the use of the disinfectant chlorine, and that, in accordance with an important and significant aspect of the within inventive method and apparatus, such volatile or low molecular pollutants are released to atmosphere when returning to the filter compartment 26. That is, as a result of the heat imparted to the water volume 48 in the evaporator 14 by the heater 50 and the return of this heated fluid, which, in practice, is typically at around 100 degrees Centigrade, the conditions of temperature and pressure within the filter compartment 26 are such as to result in a phase change from liquid to vapor of these highly volatile pollutants, and thus the release thereof to atmosphere. This is important since these volatile pollutants are not part of the steam 62 which is within the evaporator 14 and which, as part of the distillation process, is allowed to pass from the evaporator 14 into the condenser of the system, in which it is changed from a vapor back into a fluid state. Thus, the steam 62 which flows from the evaporator 14 through passageway means 72 into the condenser 18 for a phase change from vapor back into a liquid form 16 has had removed therefrom not only the pollutants which are ordinarily removed by the distillation process, but there is also absent in the purified water 16 the highly volatile pollutants which were released to atmosphere when in the filter compartment 26, and thus when not within the closed confines of the evaporator 14. Thus, the heated and filtered water 44, from which there has been a release 70 when in the filter compartment 26 of the highly volatile pollutants, returns via the fluid connection 46, this time in the directio from left to right as viewed in FIG. 2 back into the evaporator 14, and is in a second state of purification in which it has had removed therefrom the heavy molecular pollutants by the filter 12 and also the volatile or light molecular pollutants by the phase change release 70. This second stage of purified water however still contains totally dissolved solids such as undesirable minerals and metals and the like which, however, are effectively removed by the distillation process. More particularly, the fluid returning back to the evaporator 14 is then effectively heated by the heater 50 to the boiling point and released from the fluid volume 48 as steam, this distillation process being effective in purging the steam 62 of minerals and other totally dissolved solids which, unlike water, does not undergo a phase change, and thus such steam 62 is in a third stage of purification in which the totally dissolved solids are also removed therefrom.

Steam 62, as already noted, flows through the passage means 72 into the condenser 18 in which it experiences a decrease in temperature and thus undergoes a phase change from vapor back into fluid and provides the water source 16 which is in a final fourth stage of purification in which, for all practical purposes, all of the pollutants have been effectively removed therefrom.

Still referring to FIG. 2, it will, of course, be understood that continued operation of the water purifier 10 will result in a build-up of the volume of potable water 16 in the condenser 18 until the level thereof is sensed by a diaphragm-operated level sensing device 34 as being at a selected elevated level to terminate the production of purified water. Thus, at such level which provides enough purified water for drinking or other purposes at the point-of-use of the water purifier 10, device 34 will be understood to be effective to generate a pulse which is transmitted via an electrical conductor 74 to open a switch or otherwise terminate the energization and thus operation of the electrical heater 50. When the heater 50 ceases to operate, there is, of course, a corresponding discontinuation of the production of steam 62 and thus of the steam pressure 64 pushing down on the water volume 48 in the evaporator 14. As a consequence, the levels of the water volumes 44 and 48 equalize via the fluid connection 46 since they are unaffected by the generation of steam within the evaporator 14. Since inlet valve 36 is still in an open condition, potable water from the municipal system continues to flow through the inlet 38, through the valve 36 and the conduit 40 for filtration through the filter 12 and overflowing therefrom through the upper openings 12b into the filter compartment 26. There is thus a build-up in the water volume 44 causing ascending movement in the float 52 until the lateral projection 56 on the float establishes physical contact with an upper electrical contact 76 of an electrical switch and thus the opening of the electrical circuit 80 which results in a de-energizing of the solenoid coil of the inlet valve 36. When this occurs, valve 36 assumes its normally closed position, thus terminating the flow of potable water from the municipal system into the water purifier 10. The water purifier 10 is then in a condition in which there is a stored volume of purified potable water 16 in the condenser 18 which at the point-of-use is consumed, i.e., by being removed from the condenser 18 via the tap 30 through the exit conduit 32, thereby resulting in descending movement of the volume 16 away from the level sensing device 34. Immediately there is no effect of this descending movement in the volume 16, but ultimately a lower level is reached at which the distance of the level 16 from the device 34 results in the device 34 being effective to turn on the heater 50 in the evaporator 14. At this time, and as now will be explained, there is a replenished volume of water 48 in the evaporator 14 to apply the distillation process in order to produce purified water.

Figure 3:
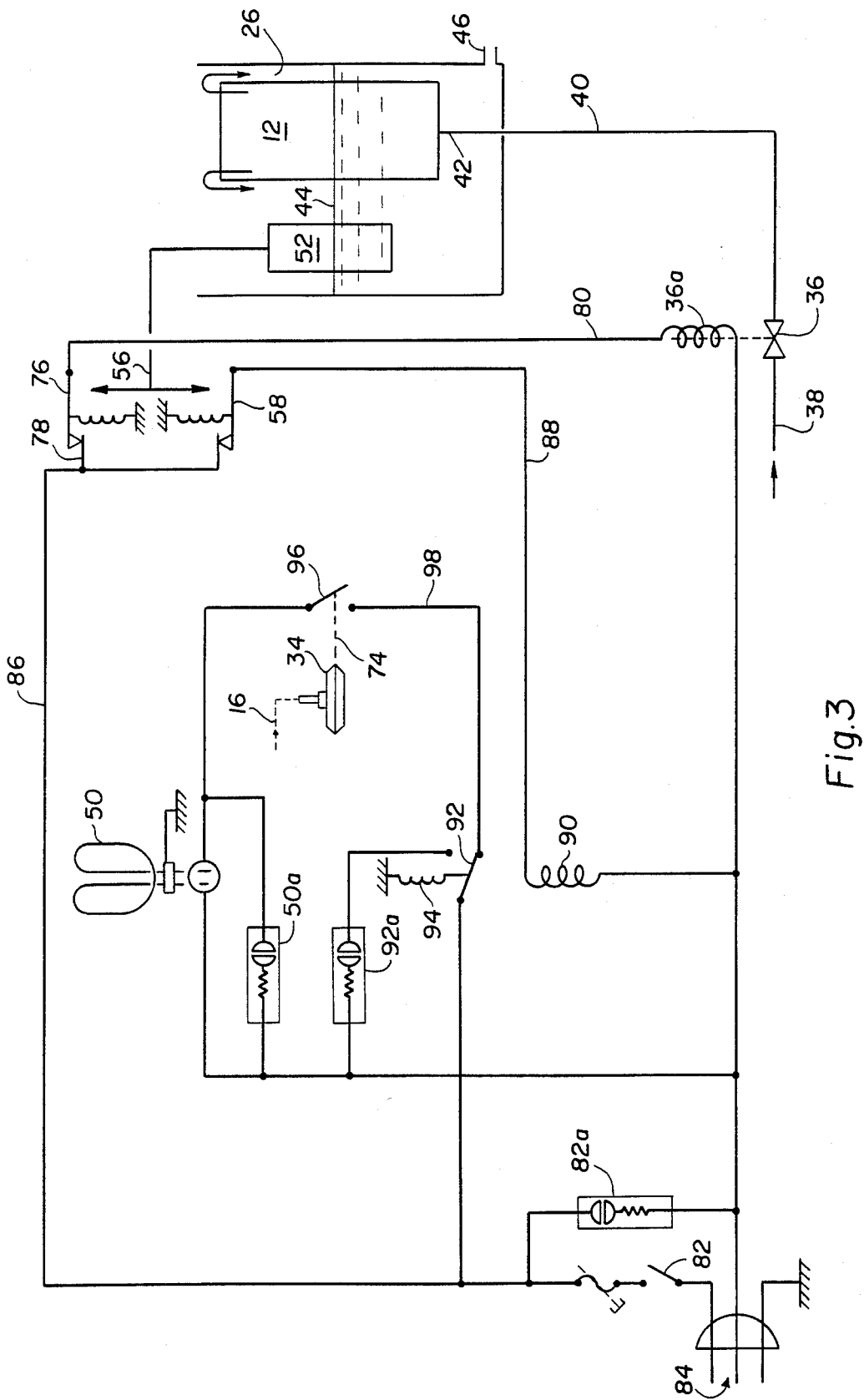
FIG. 3 is a wiring diagram of the electromechanical components of the within inventive device and a schematic of its controls.

To best understand the controls of the water purifier 10 reference should be made to the circuit diagram of FIG. 3 in which not only are the electrical components illustrated, but also the mechanical elements, such as the float 52 and heater 50, the latter being diagramatically illustrated. Referring to FIG. 3, operation of the water purifier 10 is commenced by closing the "On" button or main switch 82 which connects an electrical source 84, such as the electrical power supplied by a utility company, to a circuit including the previously noted conductor 80 of the upper contact 76 of the float 52 and a conductor 86 which includes the main switch 82. Conductor 80 includes a solenoid coil 36a of the valve 36 and thus results in the energizing of the coil 36a which, in turn, will be understood to open the valve 36 against spring bias which normally holds this valve closed. When valve 36 opens, the potable water from the municipal water supply enters into the device 10 through the conduit 38 and conduit 40 connected to the bottom of the filter 12 through which said water flows under the pressure head of the municipal water supply system out through the top openings 12b of the filter, and thus starts to fill the water compartment 26.

The water level 44 in the compartment 26 can either be at its lowest level in which the float 52 might be holding open the lower contact 58, or it may be above the contact 58, but is clearly below the upper contact 76. Assuming that it is below the contact 58, said contact will be open and thus will prevent the energizing of a circuit which includes the conductor 88 and a solenoid coil 90 of a safety switch 92 which has an operative effect on the operation of the heater 50. That is, as long as safety switch 92 is held open by spring bias 94, the heater circuit 98 cannot be completed and this prevents the operation of the heater 50. Thus, there is a lower level of water in the evaporator 14 at which it is not safe or prudent to commence the operation of the heater 50 because the heater coils will not be sufficiently immersed in the water. Note that although it is the water level 48 which exists in the evaporator 14 which is critical to the operation or non-operation of the heater 50, that this water level is sensed by the level that is assumed by the volume 44 in the filter compartment 26, these levels being substantially the same as a result of the equalization that occurs by virtue of the fluid connection 48 which exists between the filter compartment 26 and the interior of the evaporator 14.

Continuing with the description of the operation of the water purifier 10, and assuming that the float 52 has been raised above the contact 58, inasmuch as the valve 36 is still being held open by the solenoid coil 36a, the water continues to flow into the water purifier 10 and thereby raises the water levels 44 and 48 in the filter compartment 26 and evaporator 14, respectively. Since it was assumed that the level sensing device 34 of the condenser 18 has not turned on the heater 50, the levels 44 and 48 continue to rise unaffected by any steam pressure generated in the evaporator 14. Eventually, the volumes 44 and 48, at the same level, reach a selected elevation at which the float 52, or, more particularly, the lateral projection 56 thereon, physically abuts against the upper contact 76 and thus opens the switch 78 causing a de-energizing of the coil 36a, and thus causes the valve 36 to return under its spring bias to its normally closed position. The closing of the valve 36 of course terminates the flowing of supply water into the water purifying device 10. Thus, the water purifier 10 is in a condition in which the heater 50 is not operating to cause any distillation of any water within the evaporator 14 and the inlet valve 36 is closed, thus preventing any further inflow of water into the device 10, although the water levels 44 and 48 in the filter compartments 26 and 14a, respectively, are at the higher level in which the contact 76 has been actuated open by the float 52. Thus, device 10 is non-operational, except as it functions as a sterilized storage device for the purified water 16 to be withdrawn from the condenser 18 as required. In this regard, it will be noted that the operation of the device 10 is intermittent, in that steam 62 is delivered on an intermittent basis from the evaporator chamber 14a into the condenser 18 to replenish the supply 16 therein, and it has been found in practice that this intermittent introduction of the steam into the condenser 18 is effective in maintaining the interior walls of the condenser 18 sterile and otherwise free of bacteria. In effect, the steam that is introduced into the condenser 18 on an intermittent basis not only undergoes a phase change which results in the production of purified water 16, but it also functions just as steam does in an autoclave in sterilizing the interior walls of the condenser 18.

Continuing with the description of typical point-of-use utilization of the water purifier 10, eventually the consumption of the purified water 16 will result in the lowering of the water level 16 far enough below the level sensing device 34 that the device 34 generates a pulse or otherwise has an operative effect via an operative connection which results in the closing of switch 96 and the completion of a circuit 98 which causes the energizing of the heater 50. After several minutes of operation of heater 50 in the evaporator 14, there is, of course, distillation of the water 48 in the evaporator and the production of steam 62 which, as already described, results in steam pressure 64 which pushes heated water from the evaporator 14 back into the filter compartment 26 for heat exchange with the filter 12 and also for release 70 of the volatile pollutants in the water supply, and also is the source of steam for delivery into the condenser 18 and a change of phase back into a fluid state from which there has been effectively removed all categories of pollutants, and thus constituting a water supply rendered suitable for drinking and other such purposes.

As perhaps may be best understood from FIGS. 2 and 3, and as has already been explained in the description of the operation of the water purifier 10, there is a unique operational relationship between the evaporator 10 and the filter compartment 26 with respect to the two directional movements 66 of the fluid through the fluid connection 46 that connects these two components. With switch 78 open and thus valve 36 closed, and heater 50 operating upon command of the level sensing device 34, steam 62 is of course generated in the evaporator 14. Steam 62, as already noted, creates a pressure 64 on the water volume 48 thus causing descending movement therein and thus the movement of heated water from the evaporator 14 from right to left through the fluid connection 46 into the filter compartment 26. As the steam 62, however, in the evaporator 14 flows via the connection 72 into the condenser 18, or otherwise condenses back into fluid, it results in a diminishment of the pressure 64 exerted on the volume 48. As can be readily appreciated, this in turn results in the pressure head represented by the level 44 in the filter compartment 26 becoming greater than the forces being exerted on the water level 48 in the evaporator 14, and thus a movement of water from the volume 44 through the fluid connection 46, from left to right, and thus back into the evaporator 14. Continued operation of the heater 50 results in continued production of steam 62 and a build-up again of steam pressure 64 which acts on the water volume 48, and which eventually then overbalances the pressure head 44 of the fluid volume in the filter compartment 26, to thereby produce fluid movement, from right to left, through the fluid connection 46 back into the filter compartment 26. Thus, there is fluid movement in opposite directions 66 back and forth between the evaporator 14 and the filter compartment 26 with the result, as determined in practice, of providing a heat source for heat exchange with the filter 12 so that the filter is partial to the removal of heavy molecular pollutants and also with providing a chamber that is open to atmosphere from which the more volatile pollutants experience a release 70 to atmosphere, and thus are not released when within the confines of the evaporator 14 so as to continue to remain as a contaminant in the water supply that is intended for consumption.

In the commercial embodiment it will of course be understood that there will be the usual structural attributes that enhance the operation of the water purifier 10. For example, and referring to FIG. 3, the closing of the main switch 82 will also result in the energizing of a neon light 82a signifying that the power is "on." Similarly, when the water level in the evaporator 14 is below that which is considered safe for operation of the heater 50, the opening of the safety switch 92 by the spring bias 94 will result in the energizing of a red neon light 92a. When, however, float 52 has risen above the level of the contact 58, thus resulting in the closing of the safety switch 92 the red neon light 92a will of course go off. When both switches 92 and switch 96 operated by the level sensing device 34 are in their closed position, thus permitting the energizing of the heater circuit 98, this will also result in the energizing of a green neon light 50a signifying that the heater 50 is operating.

Also, to prevent an excessive build-up of steam pressure in the condenser 18 that could adversely effect the operation of the unit, a vent opening 21 to atmosphere is provided in the rear leg 20a. Opening 21 however, should be sized not to permit the release of an undue amount of steam to atmosphere since this can adversely lower the back pressure 64 to an extent that it does not force water to shuttle back and forth between the evaporator and filter compartment for the purposes previously noted, and thus the sizing thereof is an operating parameter which is readily determined in practice by trial and error. Still further, the location of a single vent opening 21, or several such openings, is advantageously in the inside wall of the leg 20a and thus in facing relation to the filter 12, so that the steam being released through the opening 21 also contributes to heat exchange with the filter 12.

A commercial embodiment of the water purifier 10 will also include, in addition to the usual electrical components, the necessary physical structural features to facilitate its use. Since these structural features are those that would occur to one well versed in the art and are not the crux of the invention, they have not been described so as not to obscure the inventive features which have been described. For example, as a result of the distillation process which is practiced within the evaporator 14, it can be readily understood that there will be an accumulation of residue in the evaporator 14 which from time to time must be removed. Thus, to facilitate this removal, the exterior housing 14b of the evaporator is advantageously made in two parts which are readily detached by removing the bolts 14c and which then permits ready access into the interior of the bottom half of the evaporator 14 through the opening 14d.

Also, although not shown, it will be understood that in addition to the activated carbon materials 68 in the filter 12 that there will also be readily embodied within the housing 12a of the filter, preferably at the top, effective means for physically filtering the water being forced through the filter 12 of particulate and other undesirable materials of a size from 5 to 10 microns. An appropriate material which is well known to produce this effect is polyester wool fiber and is available from many commercial sources.

Also, the valve and level sensing devices such as the float 52 and diaphragm-operated device 34 are well known in their operation and construction and are readily available from numerous commercial sources. For completeness' sake, it is noted that favorable results have been achieved using as the float 52 a cylindrical, hollow float, made of polypropylene plastic sheet, having an internal volume of 200 milliliters, readily available from numerous commercial sources; for the diaphragm-operated level sensing device 34, a device manufactured by Eaton Corporation, Carol Stream, Illinois, as their Series 1000 pressure control switch adjusted so that electrical contact is made when the pressure supplied to its port is less than 1.0 inches of water head, and electrical contact is broken when pressure is greater than 3.0 inches of water head; as the activated carbon materials 68 for the filter 12, a material manufactured by the Calgon Corporation, Pittsburgh, Pennsylvania and known as their F-300 grade; as the inlet valve 36 a valve also manufactured by the Eaton Corporation, as their S-30 direct acting, solenoid, water control valve; and as the heater 50 a 1000 watt resistance, immersion heater manufactured by the Precision Tubular Heater Corporation of Franklin, Tenn.

A commercial embodiment of the water purifier 10 may also deviate somewhat from the physical arrangement described herein. For example, instead of having a transverse wall 14 dividing the operative compartment 22 into the filter compartment 26 and the evaporator compartment 28, the filter 12 and evaporator 14 can be individually housed and a fluid connection, performing the function of the fluid connection 46, operatively arranged between these individually housed components. In such an arrangement therefore, there would not be a transverse wall 24, but rather the walls of the individual housing for the filter 12 and the evaporator 14 that are adjacent to each other would be the mechanical equivalent of the transverse wall 24 and there would be included a hollow cylinder which provides a fluid connection 46 between these individual housings for these components.

In other respects as well, it is understood that there is to be a latitude of modification, change and substitution in the foregoing disclosure and that in some instances some features of the invention, both as to its method and product aspects, will be employed without a corresponding use of other features. Accordingly, it is appropriate that the appended claims be construed broadly and in a manner consistent with the spirit and scope of the invention herein.

What is claimed is:

1. A method of separating by evaporation hydrocarbons from drinking water using a heated activated carbon filter comprising the steps of establishing communication through a fluid connection between an evaporator closed to atmosphere and a compartment having said activated carbon filter, flowing under pressure said drinking water through said activated carbon filter and from thence in a first direction through said fluid connection from said activated carbon filter compartment into said closed evaporator, causing by evaporation in said closed evaporator the production of steam from said drinking water which is partially channelled into a condenser for a phase change back to fluid incident to being used as purified drinking water, allowing a remaining portion of said produced steam in said closed evaporator to force the heated drinking water therein to flow in a reverse second direction through said fluid connection from said closed evaporator back into said activated carbon filter compartment for establishing physical contact with the exterior of said activated carbon filter, and causing by heat exchange between said back flowing heated drinking water and said activated carbon filter the heating of said filter, whereby said drinking water being forced under pressure through said filter is exposed to said heated activated carbon which enhances the filtering of hydrocarbons therefrom.

2. The method of producing purified drinking water as claimed in claim 1, wherein said condenser is disposed in surrounding relation about said filter compartment and there is additional heat exchange between said steam entering said condenser and said filter in said compartment to thereby contribute to the heating of said filter.

3. The method of producing purified drinking water as claimed in claim 2, including the venting of said filter compartment to atmosphere to thereby obviate an excessive pressure build-up in said interconnected filter compartment and evaporator.

4. The method of producing purified drinking water as claimed in claim 3, including a first step of controlling the flowing of drinking water to said filter in accordance with the level of the purified drinking water in said condenser, wherein a selected lower level of said purified drinking water in said condenser initiates said flowing of drinking water to said filter and a selected higher level therein terminates said flow.

5. The method of producing purified drinking water as claimed in claim 4, including a second step of controlling the flowing of drinking water to said filter in accordance with the level of the partially purified drinking water in said evaporator, wherein a selected high level of said partially purified drinking water in said evaporator is adapted to terminate any flowing of drinking water to said filter.

6. A method of purifying water containing heavy molecular pollutants, light molecular pollutants, and minerals, comprising the steps of filtering an initial volume of said water through an activated carbon filter in a first compartment open to atmosphere to produce a first stage of purified water having said heavy molecular pollutants removed therefrom by said activated carbon filter, but still containing said light molecular pollutants and minerals, flowing said first stage purified water through a conduit in a first direction into a second compartment closed to atmosphere having a heater therein, heating said first stage purified water in said second compartment to the boiling point thereof to produce a phase change into steam, urging under the pressure of said steam the movement of said heated first stage purified water in a reverse direction through said conduit back into said first compartment, venting to atmosphere from said heated first purified water said light molecular pollutants to produce a second stage of purified water having said light molecular pollutants removed therefrom by said venting but still containing said minerals, increasing the pressure head of said second stage purified water in said first compartment with an additional volume of water, urging under the pressure of said increased pressure head in said first compartment the movement of said second stage purified water through said conduit in said same first direction back into said second compartment, heating said second stage purified water in said second compartment to the boiling point thereof to produce steam in a third stage of purification having said minerals removed therefrom, and condensing said steam into water, whereby said water is in a final fourth stage of purification having had previously removed therefrom when in said first compartment said heavy molecular pollutants by said activated carbon filter and said light molecular pollutants by said venting to atmosphere, and when in said second compartment said minerals.

7. The method of claim 6, wherein said heated first stage purified water reentering said first compartment from said second compartment heat exchanges with said activated carbon filter to maintain said filter at an elevated temperature to thereby enhance the removal of said heavy molecular pollutants.

8. A method of purifying water containing heavy molecular pollutants, light molecular pollutants, and minerals, comprising the steps of filtering an initial volume of said water through an activated carbon filter maintained at an elevated temperature in a first compartment open to atmosphere to produce a first stage of purified water having said heavy molecular pollutants removed therefrom by said activated carbon filter, but still containing said light molecular pollutants and minerals, flowing said first stage purified water through a conduit in a first direction into a second compartment closed to atmosphere having a heater therein, heating said first stage purified water in said second compartment to the boiling point thereof to produce a phase change into steam, urging under the pressure of said steam the movement of said heated first stage purified water in a reverse direction through said conduit back into said first compartment, venting to atmosphere from said heated first stage purified water said light molecular pollutants to produce a second stage of purified water having said light molecular pollutants removed therefrom by said venting but still containing said minerals, heat exchanging said activated carbon filter with said second stage purified water to maintain said filter at said elevated temperature to thereby enhance the removal of said heavy molecular pollutants, increasing the pressure head of said second stage purified water in said first compartment with an additional volume of water, urging under the pressure of said increased pressure head in said first compartment the movement of said second stage purified water through said conduit in said same first direction back into said second compartment, heating said second stage purified water in said second compartment to the boiling point thereof to produce steam in a third stage of purification having said minerals removed therefrom, and condensing said steam into water, whereby said water is in a final fourth stage of purification having had previously removed therefrom when in said first compartment said heavy molecular pollutants by said activated carbon filter and said light molecular pollutants by said venting to atmosphere, and when in said second compartment said minerals.

9. A water purifier comprising an external U-shaped condenser having a rear and side legs bounding an interior operative area, wall means oriented transverse to said side legs of said condenser subdividing said operative area into a rearwardly disposed filter compartment having an inlet for water to be treated and a forwardly disposed evaporator compartment having an outlet for purified water, a filter and an evaporator operatively disposed respectively in said filter and said evaporator compartments, and an opening in said transverse wall means for establishing fluid movement in opposite directions of any drinking water between said compartments and with respect to said filter and evaporator therein, whereby said drinking water is adapted at times to flow through said transverse wall means opening after being filtered into said evaporator and at other times to flow in a reverse direction back to said filter under steam pressure generated by said evaporator to thereby heat and filter incident to improving the filtering service thereof.

10. A water purifier as claimed in claim 9, including a heater in said evaporator and water level sensing means in said filter compartment adapted at a selected lower level of said drinking water therein to initiate the operation of said heater and at a selected higher level to terminate the flowing of any drinking water into said filter compartment, whereby said water purifier is operated responsive to the water levels in both said filter and evaporator compartments even though said water level sensing means is only in said filter compartment.

11. A water purifier as claimed in claim 10, including water level sensing means in said condenser adapted at a selected lower level of purified drinking water therein to initiate the flowing of drinking water to said filter in said filter compartment and at a selected higher level to terminate same, to thereby control the operation of said water purifier in accordance with the consumption of said purified drinking water.

12. A water purifier comprising an exterior U-shaped condenser having a rear and side legs bounding an internal operative area, a transverse wall extending between the opposite side legs of said U-shaped condenser subdividing said operative area into a rearwardly disposed filter compartment having an inlet for water to be treated and a forwardly disposed evaporator compartment having an outlet for purified water, a filter and an evaporator operatively disposed respectively in said filter and said evaporator compartments, a water level equalizing opening in said transverse wall for establishing any drinking water in said filter and evaporating compartments at the same level, a heater in said evaporator, and a water level sensing means in said filter compartment adapted at a selected lower level of said drinking water to initiate the operation of said heater and at a selected higher level to terminate the flow of any drinking water into said filter compartment, whereby said water purifier is operated responsive to the water levels in both said filter and evaporator compartments even though said water level sensing means is only in said filter compartment.

* * * * *